Jan. 5, 1937. V. W. MacISAAC 2,066,479
FLUID STRAINING METHOD AND APPARATUS
Filed June 8, 1931 2 Sheets-Sheet 1
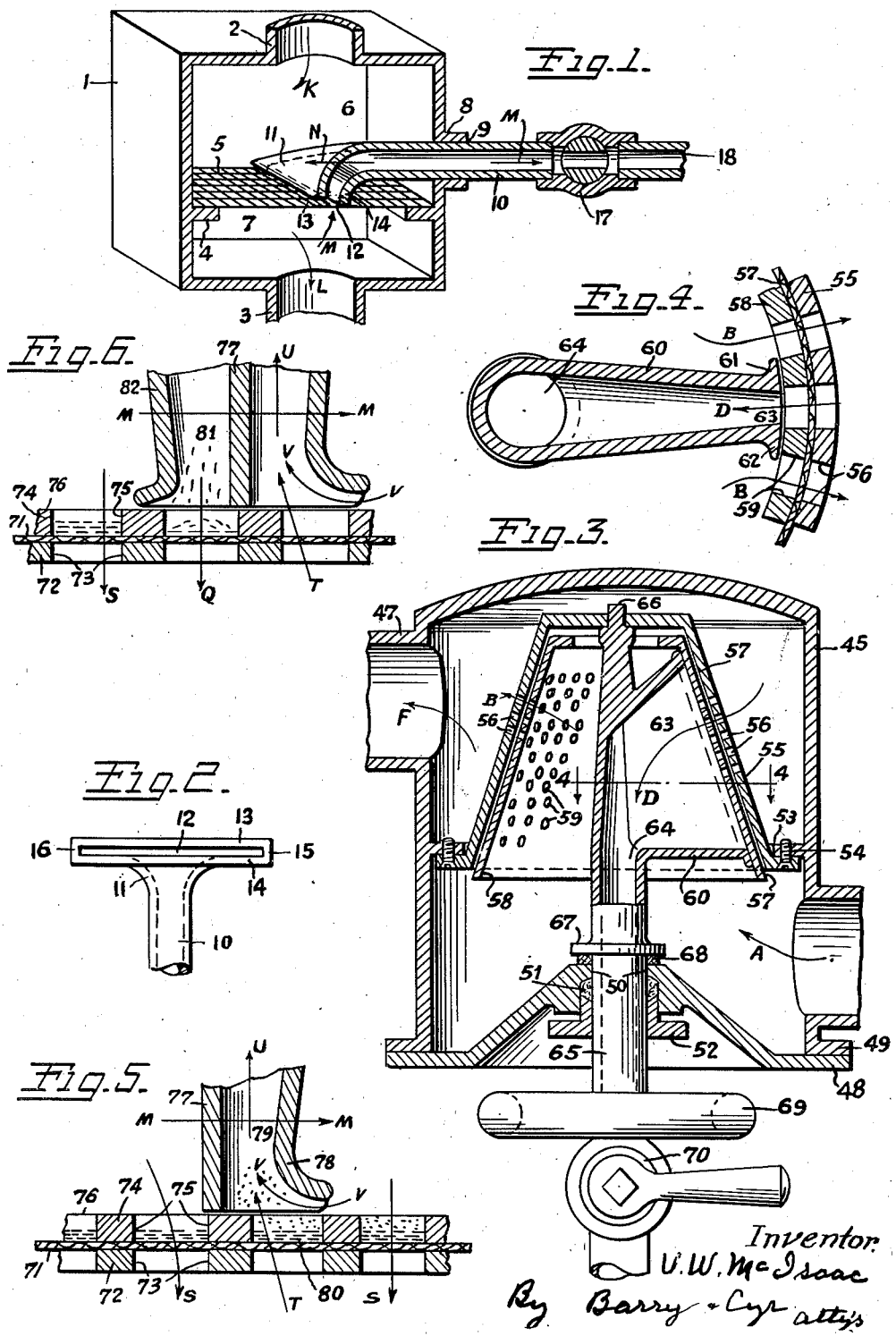

Jan. 5, 1937.  V. W. MacISAAC  2,066,479
FLUID STRAINING METHOD AND APPARATUS
Filed June 8, 1931   2 Sheets-Sheet 2
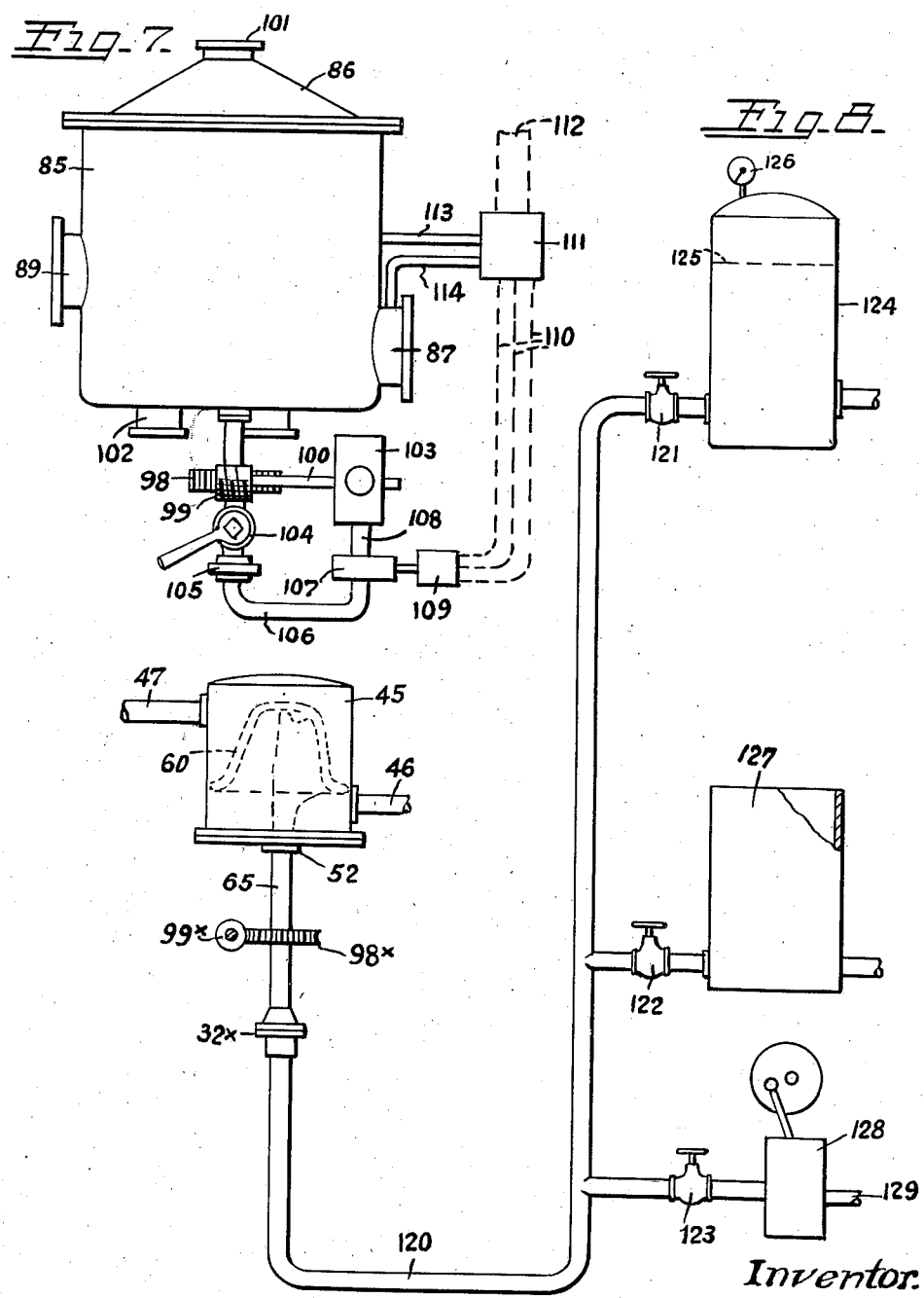
Inventor.
V. W. McIsaac
By Barry & Cyr
attys Patented Jan. 5, 1937

2,066,479

UNITED STATES PATENT OFFICE 2,066,479

FLUID STRAINING METHOD AND APPARATUS

Vernon W. MacIsaac, Montreal, Quebec, Canada

Application June 8, 1931, Serial No. 542,899

10 Claims. (Cl. 210—167)

The invention pertains to a method and apparatus for the straining of fine particles from fluids as described in the present specification and illustrated in the accompanying drawings that form part of the same.

The invention consists essentially in the novel means of removing accumulated solid or semi-solid particles from the foraminated strainer medium, their disposal and such means in combination with features adapted to improve the straining action and to render the strainers adaptable to many useful services, as pointed out in the claims for novelty following a description in detail of suitable constructions.

The objects of the invention are to facilitate the removal of accumulated particles from fluid strainers automatically or with minimum labor and with simple apparatus of less cost than commonly employed and to adapt pressure strainers to wider uses by providing unique means of removal of strained-out materials in a continuous or intermittent manner without disengaging the strainer from uninterrupted service.

The improvement facilitates the freeing of liquids and gases from objectionable solid or semi-solid fine particles where it is desired to remove and discard such particles in the process of purifying a main stream of flowing fluid as in the filtering of water for domestic and industrial purposes.

The improvement is also specially useful in the removal of valuable solids from a fluid stream to recover them for use while the carrying fluid, after the removal of said solids therefrom, may either be rejected or retained for valued use, as in the recovery of fibrous vegetable pulps from liquid suspensions in the pulp and paper industry and of mineral particles in metallurgical processes and the like or for the thickening and concentration of such liquid suspensions by filtering out part of the carrying liquid.

Heretofore the use of pipe line pressure strainers has been limited owing to difficulties met with in their maintenance and the amount of attention and labor required to keep them reasonably clean and where installed in duplicate the high cost of strainers and valves has militated against their extensive use. The present invention serves to overcome these objectionable features as more particularly explained hereinafter.

In the purification of liquids flowing through pipes under pressure many kinds of strainers have been employed, consisting mainly of a strong outer casing and having the fluid chamber therein divided by a perforated straining medium, through the apertures of which the liquid may flow from the upstream space into the down stream space while retaining on the upstream face of said straining medium solid particles of a size dependent upon the size of the apertures.

Where the straining out of fine particles has been required or where the quantity of impurities has been great the use of a single straining unit of this kind has commonly led to operating difficulties due to plugging up of the straining mediums causing restriction of flow and variations in flow and pressure of the delivered fluid frequently resulting in bursting of the strainer medium by unbalanced pressure. Such conditions require frequent vigilant inspection and manual cleaning of the filter attended by complete interruption of service and disassembly of the filtering unit involving, in most instances, the unbolting of cover plates from the casing and removal of the filtering medium through a port in the casing to permit it to be manually cleaned.

To avoid this complete interruption of flow in the pipe line during the cleaning operation it has been common practice to install two (or more) units in parallel so connected by pipes and valves that one unit at a time may be taken out of service for manual cleaning while the other may continue in operation without discontinuing the flow of fluid. The labor and attention involved in such cases, of course, is as great as with the single unit and the cost of two units with the necessary valves is much greater. This is true also where the pair of strainers are built together as a so-called "duplex" unit with valves built into the assembly.

The present invention overcomes the above difficulties by providing means of cleaning the strainer medium easily and rapidly without disassembly and without interrupting the flow of fluid through the strainer so that only one unit need be installed in a pipe line without byepass and without valves. Further the cleaning method is adaptable to being made fully automatic if desired.

Again such pressure strainers have been so arranged with pipes, valves and drains that a back flow of fluid from the main stream might be made to pass through the strainer in a direction reverse to that when filtering so as to backwash the perforated strainer medium for the removal of debris therefrom and to dispose it to waste with the backwash fluid. This method necessitates taking the filter out of service during such cleaning operation and has been successful only under certain limited conditions not commonly met with. In most cases where a strainer is used and debris adheres strongly to the strainer medium and becomes imbedded and impacted therein so that it may be removed only by a backwash of great force and of higher velocity than the forward velocity commonly employed during the normal service of straining. Thus for the cleaning of the entire strainer area in one operation fluid must be drained from the system in excess of the normal rate of supply to attain effective velocity of backwash so that, even where duplex strainers are used, effective backwashing can only be secured by excessively diminishing the flow of the main stream and large wastage of fluid.

The present invention employs the principle of backwashing and surface flushing of the strainer medium but requires only very small withdrawals of fluid from the main stream because only a small portion of the strainer area is treated at a time and a vigorous high velocity backwash may thus be achieved with a small rate of flow and slight wastage of fluid, while no interruption of service or duplication of strainers is required.

Attempts to overcome some of the disadvantages of common strainers have led to the devising of complex apparatus having filter screens moveable within their casings, expensive in construction and difficult to operate.

In the preferred form of the present invention the filter medium is fixed in a stationary position while complex and accurately fitted parts within the casing are avoided.

Where straining and filtering mediums are used to separate valuable solids from fluid suspensions the present invention provides a method of continuously or intermittently removing the solids specially adapted to permit their delivery through conductors, under pressure of the main fluid, to remote or elevated points of disposal.

The foregoing statement sets forth principal objects of the invention but additional advantages and uses will be made evident in the detailed description which follows, in conjunction with illustrations of suitable forms of construction in the accompanying drawings in which:

Fig. 1 is an isometric half cross section of apparatus embodying the simpler elements of the invention.

Fig. 2 is a bottom view of a principal part shown in Fig. 1 and called a scavenging nozzle.

Fig. 3 is a half cross sectional elevation of a preferred form of the invention.

Fig. 4 is a fragmentary sectional plan of essential parts of the apparatus of Fig. 3 along plane 4—4 thereof.

Fig. 5 is a fragmentary section of parts similar to those of Fig. 4 but modified for a detailed description of effects produced in the action between strainer member and nozzle shown.

Fig. 6 is similar to Fig. 5 with an added detail of a nozzle not illustrated elsewhere.

Fig. 7 is an elevation of one form of the apparatus with operating and control means added to illustrate a method of operation and control applicable to any other form of the invention.

Fig. 8 is a side elevation partly broken away of one form of a complete apparatus embodying the invention.

Figure 1 shows in isometric half cross section a pressure tight casing 1 having an inlet pipe 2 for the inflow of fluid under pressure carrying therewith the solid particles to be strained out. Outlet 3 carries purified fluid from the casing to a pipe system for distribution to service outlets. Inwardly projecting ledge 4 has secured to it a foraminated straining member 5 dividing the chamber of the casing into two parts, an upstream space 6 and a downstream space 7. The straining member 5 is indicated in this figure as being made of coarse wire mesh but any suitable straining medium may be used to fit the service intended. Thus perforated metal sheets may be used or one or more layers of fine wire sieve cloth suitably supported, or a sheet of fibrous textile, a mat of loose fibres supported by a rigid perforated wall, a layer of sand held between two such walls, etc. The apparatus is not restricted to the use of any particular filtering medium.

The casing wall has a projecting annular boss 8 surrounding a circular opening 9 into which is slidably fitted the hollow pipe member 10 the inner end of which projects into upstream space 6 and is broadened and flattened to form a hollow nozzle head 11 having therein a narrow slot opening 12 facing the straining member 5, said slot being formed between long parallel bounding lips 13 and 14 and having short walls 15 and 16 bounding the ends of the slot, the whole constituting a scavenging nozzle extending from edge to edge of the strainer medium 5 and having the parallel tubular part 10 of such length and relation to head 11 that it may be pushed and pulled in a sliding manner through opening 9 to move nozzle inlet 12 to cover all parts of the strainer 5. Valve 17 is mounted between conductor 10 and continuation pipe 18 and is manually operable to establish or to stop communication of the nozzle interior space with pipe extension 18 and the region to which it may discharge.

Figure 2 is a view of scavenging nozzle of Figure 1 as seen from the side which faces the strainer and more clearly depicts the shape of slot 12 which is made long to cover the full width of strainer 5 and narrow to reduce the area of the nozzle opening for the better effecting of high velocity of fluid flow therethrough with small volumetric rate of flow. Pipe 18 communicates with any desired region having a fluid pressure less than that within the casing. In common practice where the pressure of fluid within the pipes 2 and 3 (and casing 1) is greater than atmospheric the pipe 18 may discharge directly into the atmosphere.

To explain the action of the device assume inlet pipe 2 to be connected to a source of impure water supply delivering it into upstream space 6 at 20 pounds per square inch gauge pressure (i. e. above atmospheric). During the normal use of the strainer water will flow as indicated by arrow K into space 6 then pass through straining member 5 depositing thereon the solid impurities; thence it will enter space 7, relieved of the impurities, at a pressure but slightly less than that in space 6 depending upon the resistance to flow offered by the strainer member 5;

hence it will flow as indicated by arrow L into pipe 9 to the water delivery system.

Accumulation of debris upon screen 5 will gradually plug up the openings therethrough and so increase the resistance to flow until the pressure in space 7 may be much less than that in space 6 thus interfering with the proper delivery of pure water and rendering strainer 5 liable to rupture from the unbalanced pressure in the upstream compartment. Suppose that a pressure drop through the strainer of 2 pounds per sq. in. has been reached and that this is all that may be tolerated. Then we have a gauge pressure of 18 pounds per sq. in. in the downstream space 7.

Now if valve 17 be opened allowing communication of nozzle interior with the atmosphere (to which pipe 18 delivers) it is evident that the 18 pounds pressure in space 7 will cause a rapid backwash flow of water in the direction of arrow M through strainer 5, through nozzle opening 12, passage 18 and to atmosphere, carrying with it solids accumulated upon that portion of the upstream face of 5 which is opposite slot 12.

The whole surface of strainer 5 may be quickly cleaned by manually sliding part 10 through hole 9 to cause the nozzle head 11 with its opening 12 to traverse the whole length of strainer 5, as in the direction indicated by arrow N.

The velocity of flow through nozzle inlet 12 may be regulated by valve 17 to a slow rate when the solids may be readily dislodged or to a very rapid velocity of backwash when the solids are tenaciously adherent to screen 5.

If the solid impurities be accumulated in a thick layer on strainer 5 and if the lips 13 and 14 of the scavenging nozzle be held close to the strainer surface as the nozzle is pushed inwardly across the strainer, as indicated by direction arrow N, during the process of cleaning, it is evident that part of such impurities will be scraped forward by the push of lip 13 and that only a small part of the impurities left imbedded in the screen will be removed by backwash (arrow M) through the strainer 5 and nozzle opening 12.

In some applications such a scraping action is desirable to remove the bulk of impurities to a storage sump or to convenient places for subsequent removal, and such an action is intended in one form of the invention.

In general, however, it is desirable to remove all impurities through the scavenging nozzle in which case the forward lip 13 is preferably held at a distance from strainer 5 while rear lip 14 may ride directly thereon or be constrained to move close to the strainer. In such an arrangement it is evident that the flow of water into slot 12 will not be entirely a backwash through strainer 5 from space 7, as indicated by arrow M, but a portion will flow from upstream space 6 between lip 13 and strainer 5 to flush or scour the surface of the strainer by flow parallel to its surface and carry entrained solids into the nozzle opening 12, 17 etc. The proportion of water which thus flows along the upstream surface of the strainer screen will depend in part upon the spacing of lip 13 from the screen and the relation which such spacing bears to the width of slot 12 and the rate of flow induced through valve 17 and the resistance to flow offered by strainer 5.

This surface flushing of the strainer member is an important action in one form of the invention and will be further explained under description of Figure 5.

Under the conditions previously described a pressure of 18 pounds per sq. in. above atmosphere is assumed to exist in the fluid in the downstream space. For purposes of removing debris from the strainer member 5 it would not ordinarily be necessary to use the full 18 lbs. pressure drop to atmosphere in order to induce the flow required. Therefore nozzle valve 17 and pipe 18 may communicate with a region of fluid pressure, for instance, of 14 pounds, gauge reading, thus giving a pressure drop of 4 pounds per sq. in. to induce backwash flow through the scavenging nozzle sufficient for cleaning purposes. It is apparent that the 14 pounds pressure could then well be used to elevate the effluent wash water to a considerable height above the strainer to suitable points of disposal or the wash water may be conducted into a receiver having a contained fluid pressure approximating 14 pounds, gauge reading.

This is a particularly useful function of the device in certain applications, more particularly when it is desired to preserve and deliver the removed solids for valued use.

Again the main stream through the strainer may flow under pressures less than atmospheric in which case the stream of cleaning fluid into and through the scavenging nozzle may be induced by causing conductors 17 and 18 to communicate with a region of still lower pressure than that in the casing of the strainer. This lowered pressure may be induced by any suitable means such as a gravity leg, pump, eductor or other common device, to depress the pressure below atmospheric.

The essential condition for the operation of the cleaning device is the creation of an absolute fluid pressure in the scavenging nozzle less than the pressure of the main body of fluid in the strainer casing, whether these pressures be above or below atmospheric pressure.

The strainer in Fig. 8, is indicated generally at 45 and is provided with the pressure inlet 46 and the main discharge 47 for fluid. The stem 65 constituting an extension of the nozzle may be actuated by a suitable worm wheel 98x and worm 99x. The extension pipe 65 is connected with the pipe 120 by means of a suitable joint 82x, to permit the necessary rotary movement of the nozzle, the pipe 120 being stationary, and being adapted to deliver fluid effluent from the nozzle 60 to three different points of disposal, depending upon which one of three valves 121, 122 and 123 may be opened. The valve 121 if opened, permits delivery of effluent above the level of the strainer 45 and against gravity to a receptacle 124 which is closed and may have a gas cushion over the level of liquid 125, the pressure being indicated by a suitable gauge 126. In this case the liquid is, first, elevated against gravity, second, forced against frictional resistance to flow in the pipe 120, third, is forced against the pressure in the tank 124 by the pressure of the fluid in the strainer 45.

When the valve 122 is opened while the two other valves remain closed, the effluent is subjected to no elevation against gravity since the tank 127 is lower than the strainer 45. The tank 127 being open to the atmosphere, in this case, however, the frictional resistance of the flow in the pipe 120 between the strainer 45 and the tank 127 still prevails.

When the third valve 123 is opened and the other two are closed, a pump 128 relieves the pressure in the pipe 120 so that a pressure below atmospheric is created which will result in the flow of effluent outwardly through the pipe 120. The pipe 129 leading from the pump 128 may then be used to pump effluent on to other desired points.

Figure 3 illustrates a preferred form of the invention in half cross section, disclosing useful features not present in other forms described.

The main casing 45 is cylindrical and has a domed head at the upper end, an inlet pipe 46 and outlet 47. The lower end is closed by cover 48 secured in a fluid tight manner to outwardly projecting flange 49 of the casing. Cover 48 has a circular central opening 50 to receive a revolvable nozzle stem, the joint being made fluid tight by stuffing box 51 with follower gland 52 of usual form. The inwardly projecting annular flange 53 has secured to it by screws 54 a rigid frustoconical strainer basket 55 having many openings 56 providing fluid passages therethrough. This outer strainer basket serves primarily to support a fine mesh sieve cloth 57 or other suitable strainer medium on its inner surface.

A second basket 58 fits into 55 having openings 59 registering with the openings 56 and 55 to provide continuous through passages for fluid to be strained. Inner basket 58 is suitably fastened in a fixed position within 55 by means not shown and serves to support the sieve cloth 57, or other filter medium, on the inner side. The inner basket also serves another more important purpose to be more fully described in reference to Fig. 4 which is an enlarged fragmentary plan section of part of Fig. 3 along plane 4—4.

Part 60 is the main body of the scavening nozzle having lips 61 and 62 bounding inlet passage 63 which opens inwardly to tubular passage 64 within the nozzle stem 65 which passes through opening 50 and is journalled therein to permit rotation. At the upper end of the scavenging nozzle is a pivot extension 66 centrally journalled in the head part of basket 55 to allow rotation of the nozzle about an axis coincident with the axis of the strainer basket. Stem 65 has flange 67 projecting therefrom adapted with spacing washer 68 to fix the longitudinal position of the nozzle in respect to the strainer basket. It is obvious that the removal of washer 68, will permit the nozzle to be partially withdrawn downwardly with coincident increase of the space between inner basket 58 and the lips of the nozzle. Thus in the absence of washer 68 the longitudinal position of the nozzle may be controlled by suitable means external to the casing thus permitting adjustment of the nozzle in relation to the strainer member to be externally made. This is a useful feature of this form of the device.

Handwheel 69 which is rigidly attached to stem 65 permits rotation of the nozzle to present its inlet progressively to all parts of the strainer surface. Valve 70 is used obviously in a similar manner to like parts of other figures and needs no particular explanation in this instance. Normal flow of the main stream is inwardly as by arrow A; through the strainer as by arrows B and out from casing as by arrow F.

In Figure 4 strainer cloth 57 is shown held between outer basket 55 with its openings 56 and inner basket 58 with its openings 59 registering with the openings of the outer basket. The nature and use of the openings 59 are to be particularly noted. Each opening 59 may be considered to be a well for strained-out solids, such well, or cell, being open inwardly toward the upstream space of the strainer chamber, and laterally surrounded by a rigid rim of material constituting the body of the basket 58, and being bottomed by a straining or filtering member 57 toward the downstream space of the strainer chamber. By constructing basket 58 of ample thickness, radially, a deep accumulation of solids may be stored in these wells. In rotating nozzle 60 the lips 61 and 62 may move in close proximity to 58 with but small clearance therebetween so that the nozzle passage 63 may be reasonably well isolated from communication with the fluid of the upstream space to better induce a strong backwash flow of fluid from the downstream space to energetically remove solids in the wells 59 as flow takes place into the nozzle, indicated by arrow D. The scavenging nozzle is thus permitted to describe a path parallel to the strainer member 57, but distant therefrom, out of the way of the layer of solids deposited thereon and free from obstructive interference of the solids with its motion, but its effectiveness having been in no wise diminished by being so distanced from the strainer, because the walls surrounding the wells form, together with the nozzle member, effectively continuous passage for backwash fluid from the filter member to the low-pressure region of disposal.

Evidently for the purpose described it is not necessary that the wells be circular over the filter member as shown in the figure described. They may be of any suitable shape. With advantage such wells may be formed between longitudinal walls or divisions corresponding with and approximately coextensive with the inlet of the scavenging nozzle.

Figure 5 shows a fragmentary section of a scavenging nozzle and strainer parts to disclose more clearly the effect of solids removable by the method of surface flushing and by backwashing.

A fine strainer medium 71 is mounted between a downstream supporting member 72, corresponding to part 55 of Figures 3 and 4, having openings 73 therethrough and an upstream member 74, corresponding to part 58 of Figures 3 and 4, and having openings 75 registering with 73, and having an upstream surface indicated by 76. Inlet parts of a scavenging nozzle are shown as rearward lip 77 mounted to travel closely to surface 76 and a forward lip 78 mounted to travel at a distance from surface 76. The lip 77 produces a scraping effect on the strainer similar to the above described forms of the invention. These lips embrace a nozzle passage 79 leading to a region of low pressure as in previously illustrated devices. Motion of the nozzle lips parallel to the strainer is indicated by arrow M. The relative motion may be of the nozzle relatively to a stationary strainer part or of the strainer part relatively to a stationary nozzle. Arrows S show the direction of normal flow of fluid through the strainer during the process of straining. Arrow V indicates the direction of flow of fluid from the upstream space between lip 78 and the strainer to flush from the strainer part of the solids accumulated thereon and to carry them into the nozzle passage 79, through which they flow as indicated by arrow U to place of disposal.

Examining the action in detail it is to be particularly noted that fluid inflowing to nozzle passage 79 may come by preference from the upstream body as by arrow V because the pressure in the upstream body is greater than in the downstream body. Thus if the flow of fluid through the nozzle as indicated by arrow U be throttled to a small rate of flow, as it may be with valves already described in other figures, then the whole flow of fluid may be limited to a stream V from the upstream space to flush or scour in a gentle manner the layer of solids 80 deposited on the strainer 71 and no backwash of fluid from the downstream space will occur through the strainer as by arrow T. Thus by such control of the outflow of wash water there may be effected the removal of an upper layer of solids leaving on the strainer 71 a thin layer of solids adapted to aid the finer filtration of the main stream. This is a highly important function where a high degree of purification of fluid is required. Thus in commencing there may be added to the main stream of impure fluid fibrous or granular substances such as asbestos, paper pulp, sand, kieselguhr, charcoal etc., to form a filtration mat on the surface of the strainer 71 to gather upon it very fine solid impurities and these may be removed in large part by the surface flushing above described without carrying off therewith an undue amount of the filtering mat.

After a period of use it is desirable to remove the deposited filtering mat, as when it becomes fouled with impurities. This may be accomplished when the apparatus is of proper proportions by widely opening the valve in the conductor which drains the scavenging nozzle, thus accommodating a greater flow than may readily pass by the path of arrow V and lowering the fluid pressure in the space 79 to cause a backwash of fluid from the downstream space as indicated by arrow T. This, of course, will entrain and remove the filter mat lying on 71 and it may be disposed to waste or recovered for cleaning and reuse.

Figure 6 is similar to Figure 5 having like parts and arrows of direction bearing like numbers and letters so that particular description is omitted. An added nozzle element is shown and explained.

A second nozzle passage 81 is formed between wall parts 77 and 82 to make an inlet similar in general to the scavenging nozzle but for the purpose of directing a stream of fluid from a suitable pressure source, external to the main casing of the strainer, toward and through strainer member 71 as indicated by arrow Q. This stream is to carry to the straining member 71 and deposit thereon fluid borne solids to form a filtering mat to serve as a straining medium for the main fluid in order to remove very fine particles therefrom. This filtering material may be of fibrous or granular substance as heretofore described or where a high degree of clarification is desired it may be flocculant matter prepared by the use of suitable coagulant, and may be pressure fed into the nozzle mixed or unmixed with fibrous or granular filter improvers.

No details are illustrated of means to conduct this fluid borne material from the outside pressure source to the depositing nozzle 81 as many obvious methods of construction may be employed which may, if desired, be similar to that provided for the scavenging nozzle described but passing through the opposite end of the casing by preference.

Figure 7 illustrates a form of operative and control mechanism.

The rotation of nozzle is accomplished through worm wheel 98 and worm 99 on shaft 100 which is rotated by a fluid motor 103 deriving its power from fluid drained from the interior of the strainer body through nozzle 97, valve 104, rotary joint 105, stationary pipe 106, valve 107 provided for starting and stopping the flow, and pipe 108 to motor 103 from which it may flow to waste or to place of reuse. Part 109 is an electrical motor or solenoid means to operate valve 107 deriving its power through wires 110 and through pressure switch 111 from supply wires 112. Switch 111 is activated by fluid pressure from the strainer body as follows: Pipe 113 communicates with the down stream space 96 of the strainer and pipe 114 leads from the upstream side, as from inlet 87. When the filter medium becomes clogged with impurities the resistance to flow therethrough increases until the pressure in the down stream space may be much below that in the upstream space. This difference of pressure when it reaches a predetermined value, to which the switch actuating mechanism of 111 has been previously adjusted, operates to close an electrical circuit to open valve 107 and when the pressure difference has again dropped to a certain point it operates to close valve 107. This differential pressure switch may be of any common available type.

When valve 107 is open (valve 104 also being set sufficiently open) fluid from the main stream flows to motor 103 to set it in motion thus rotating the scavenging nozzle by means of the worm and worm wheel. Valve 104 may be set to give a desired flow of fluid for cleaning the filter and rotating the nozzle.

Evidently the motor need not be a water motor but any suitable means of revolving 97 may be used. Likewise the pressure control switch need not be electrical but may be solely mechanical to operate valve 107, such as by mechanisms commonly used in pressure regulators for fluids.

Again the cleaning mechanism need not be brought into play by the influence of varying fluid pressures as above described but it may be set to operate continuously or intermittently by a timing mechanism.

An important feature of the invention lies in the undiminished straining area in active service during the act of cleaning while straining. The active straining area remains constant at all times.

Evidently processes other than filtering and thickening may be performed by the apparatus. The application and removal of various chemically active treating solids may be performed with advantage thereby.

What I claim is:

1. A method of removing foreign particles from the straining wall of a fluid strainer consisting in inducing flow of a small part of the fluid from the main stream to an external region of lower fluid pressure, directing the resultant stream to flow from the upstream side of the straining wall over a small portion of its upstream face in a scouring manner to entrain and sweep particles from the straining wall and carry them in a confined path to the external region of disposal, causing a relative motion between the straining wall and the path of said stream to progressively expose in turn all parts of the straining wall to the scouring action in a continuously advancing manner with undiminished straining area in active use during the process.

2. A method of removing foreign substances from the straining wall of a fluid strainer consisting in scraping part of the substances therefrom and removing another part by entrainment in a flushing stream of the main fluid flowing from the upstream side of the straining wall along its upstream surface to a place of disposal external to the strainer.

3. A method of filtering particles from a fluid stream passing through an enclosing conductor consisting in placing a filtering layer of loosely aggregated solids or flocculent filtering medium across the path of the flowing fluid to clarify the fluid in its passage therethrough, the removal of such filtering medium from a small part of the filtering layer at one time by the backwashing action of part of the main fluid being processed, simultaneous replacement of filtering medium in an adjacent small part of the filtering layer thereby treating at one time a fractionally small area of the filtering layer to permit filtering of the main fluid stream to proceed simultaneously through the remainder of the filtering layer, the progression of such removal and replacement of filtering medium to all parts of the filtering layer consecutively.

4. A method of filtering foreign particles from a liquid stream flowing through an enclosing main conductor consisting in preparing a suitable filtering medium of solid particles or flocculent matter mixed with a portion of the liquid apart from the main conductor, directing the mixture into the main conductor so as to place a layer of the filtering medium across the path of the main flowing stream of liquid therein to clarify it in its passage through the said layer, removal of such filtering medium with entrained foreign particles from a small portion of the filtering layer at one time by the backwashing action of part of the main fluid being processed, simultaneous replacement of filtering mediums in an adjacent small part of the filtering layer, so treating at one time a fractionally small part of the filtering layer to permit filtering of the main fluid stream to proceed simultaneously through the remainder of the filtering layer and the progression of such treatment to all parts of the filtering layer consecutively.

5. In a fluid strainer a casing enclosing a flow chamber, an inlet and an outlet for the main stream of fluid, a stationary straining wall fixed within the chamber dividing it into an upstream space and a downstream space, a conductor terminated within the upstream space by an inlet closely opposing a small portion of the upstream face of the straining wall and moveable thereover to oppose any such portion thereof and having the forward portion thereof spaced from the straining wall and adapted to direct flow of part of the main fluid from the upstream space over a small portion of the upstream face of the straining wall to a region of disposal external to the casing of lower fluid pressure, and adapted to direct flow of another part of the main fluid directly from the downstream space back through the straining wall to the said region of disposal, means to control the rate of flow of fluid through the conductor and means to move the conductor inlet over the face of the straining wall in a continuously moving manner.

6. In apparatus for filtering fluids adapted to being freed of accumulated foreign particles while filtering a casing enclosing a flow chamber, an inlet and an outlet for the main stream of fluid, a foraminated straining wall dividing the chamber into an upstream space and a downstream space, a filtering wall of loosely aggregated filtering solids supported on the upstream face of the foraminated straining wall, a conductor in the upstream space terminated by an inlet opposing a fractionally small portion of the straining wall, said conductor adapted to direct a stream of the main fluid together with entrained filtering solids to an external place of disposal under the impulse of main fluid pressure and a conductor terminated by a nozzle outlet adjacent to the inlet of the first conductor and adapted to direct the inflow of fluid borne filtering solids from an external pressure source to the upstream face of the foraminated straining wall, and means to cause a relative motion between the straining wall and the said conductor nozzles to cause the nozzle openings to be presented progressively to face different portions of the upstream face of the straining wall consecutively.

7. In a fluid strainer, a casing enclosing a flow chamber, an inlet and an outlet for the main stream of fluid, a stationary straining member fixed within the chamber and dividing it into an upstream space and a downstream space, a member provided with a plurality of wells having short walls extending rigidly upstream from said straining member, a conductor terminated within the upstream space by an inlet closely opposing said wells and movable thereover and adapted to direct a stream of the main fluid from the downstream space back through the straining member and thence to a region of disposal external to the casing of lower fluid pressure, the individual wells having a cross sectional area of materially less size than that of the inlet of the conductor, means to control the rate of flow of the fluid through the conductor, and means to move the conductor inlet over the face of the straining member.

8. In a fluid strainer, a casing enclosing a flow chamber, an inlet and an outlet for the main stream of fluid, a straining wall of frusto-conical form dividing the chamber into an upstream space and a downstream space, a scavenging nozzle adjacent to a portion of the upstream face of the straining wall terminating in a conductor leading to a region external to the casing and adapted to remove accumulated foreign particles from the straining wall in a stream of the main fluid to the external region, and means rotatably mounting said conductor coaxially with the straining wall and means adjustably supporting said conductor in said mounting means whereby to vary the distance between the nozzle and the straining wall.

9. In a fluid strainer a casing enclosing a flow chamber, an inlet and an outlet for the main stream of fluid, a strainer wall dividing the chamber into two spaces, an upstream space and a downstream space, a conductor adapted to guide a part of the main fluid from the flow chamber under the impulse of fluid pressure within the chamber to an external region of lower fluid pressure, said conductor terminated within the upstream space by an inlet nozzle having its opening facing a fractionally small portion of the upstream face of the straining wall and power means to cause a relative motion between the straining wall and the conductor inlet nozzle to progressively present all portions of the upstream face of the straining wall to the conductor inlet nozzle consecutively, and control means actuated by the differential of pressure between the upstream and the downstream bodies of fluid to start said power means into action when said differential of pressure attains a predetermined value and to stop the action of the power means when the said differential of pressure attains another lower predetermined value.

10. In apparatus to treat a fluid by passing it in a stream through a layer of loosely aggregated particles of treating solids, a casing enclosing a flow chamber for the main fluid stream, an inlet and an outlet for the main stream, a foraminated straining wall dividing the flow chamber into an upstream space and a downstream space, a source of fluid suspended finely divided treating solids, means external to the casing to subject the fluid suspension of treating solids to a pressure greater than the pressure of the main fluid within the casing, a conductor adapted to direct a stream of the suspension therefrom to a part of the upstream space contiguous to the straining wall and to deposit the particles of treating solid thereon over a fractionally small portion of the total upstream surface thereof at one time, means to cause relative motion between the discharge end of said conductor and the straining wall to permit the deposition of solids to different portions of the straining wall consecutively and conductor means having a nozzle inlet facing the upstream face of the straining wall adapted to remove from the straining wall the treating solids in a stream of the main fluid and direct it to a region of disposal external to the casing.

VERNON W. MacISAAC.